United States Patent [19]

Machnee

[11] Patent Number: 4,619,330
[45] Date of Patent: Oct. 28, 1986

[54] FLEXIBILITY FOR WIDE SWATH AGRICULTURAL IMPLEMENTS

[75] Inventor: Cecil Machnee, Yorkton, Canada

[73] Assignee: Morris Rod-Weeder Co., Ltd., Yorkton, Canada

[21] Appl. No.: 591,785

[22] Filed: Mar. 21, 1984

[51] Int. Cl.$^4$ .................. A01B 73/04; A01B 63/22
[52] U.S. Cl. .................. 172/311; 172/456; 172/457; 172/459; 172/629; 172/632; 280/411 A
[58] Field of Search .............. 172/311, 310, 456, 457, 172/459, 466, 629, 630, 632, 633, 662; 280/411 R, 412, 413, 656

[56] References Cited

U.S. PATENT DOCUMENTS

| | | | |
|---|---|---|---|
| 2,828,680 | 4/1958 | Johnson | 172/459 X |
| 3,321,028 | 5/1967 | Groenke | 172/311 |
| 4,102,404 | 7/1978 | Krammer | 172/310 |
| 4,105,077 | 8/1978 | Seifert | 172/311 |
| 4,109,928 | 8/1978 | Watkins | 172/311 X |
| 4,191,260 | 3/1980 | Klindworth | 172/311 |
| 4,355,689 | 10/1982 | Friggstad | 172/311 |
| 4,396,069 | 8/1983 | Ferber | 172/310 |
| 4,399,785 | 8/1983 | Schaaf | 172/662 X |

FOREIGN PATENT DOCUMENTS 1016043 10/1952 France .................. 172/311

Primary Examiner—Richard J. Johnson
Assistant Examiner—Terrence L. B. Brown
Attorney, Agent, or Firm—Cushman, Darby & Cushman

[57] ABSTRACT

Improvements in flexibility for wide swath agricultural implements having hinged wing frame sections to enable the implement to be folded compactly for transport and also to better follow ground contours are provided by dividing at least one of the sections into side-by-side subsections which are pivotally interconnected for relative movement about a transverse axis. Thus, relative flexing between adjacent frame portions can take place about hinge axes parallel to travel direction while relative flexing between adjacent wing sections of the frame can take place about transverse axes. Preferably the pivotal interconnections are located to divide the frame into portions of equal width and the pivotal interconnections are reinforced by link means which connect the adjacent portions to resist bending movements about a vertical axis at the interconnection while still permitting the hinged sections to be folded.

14 Claims, 7 Drawing Figures

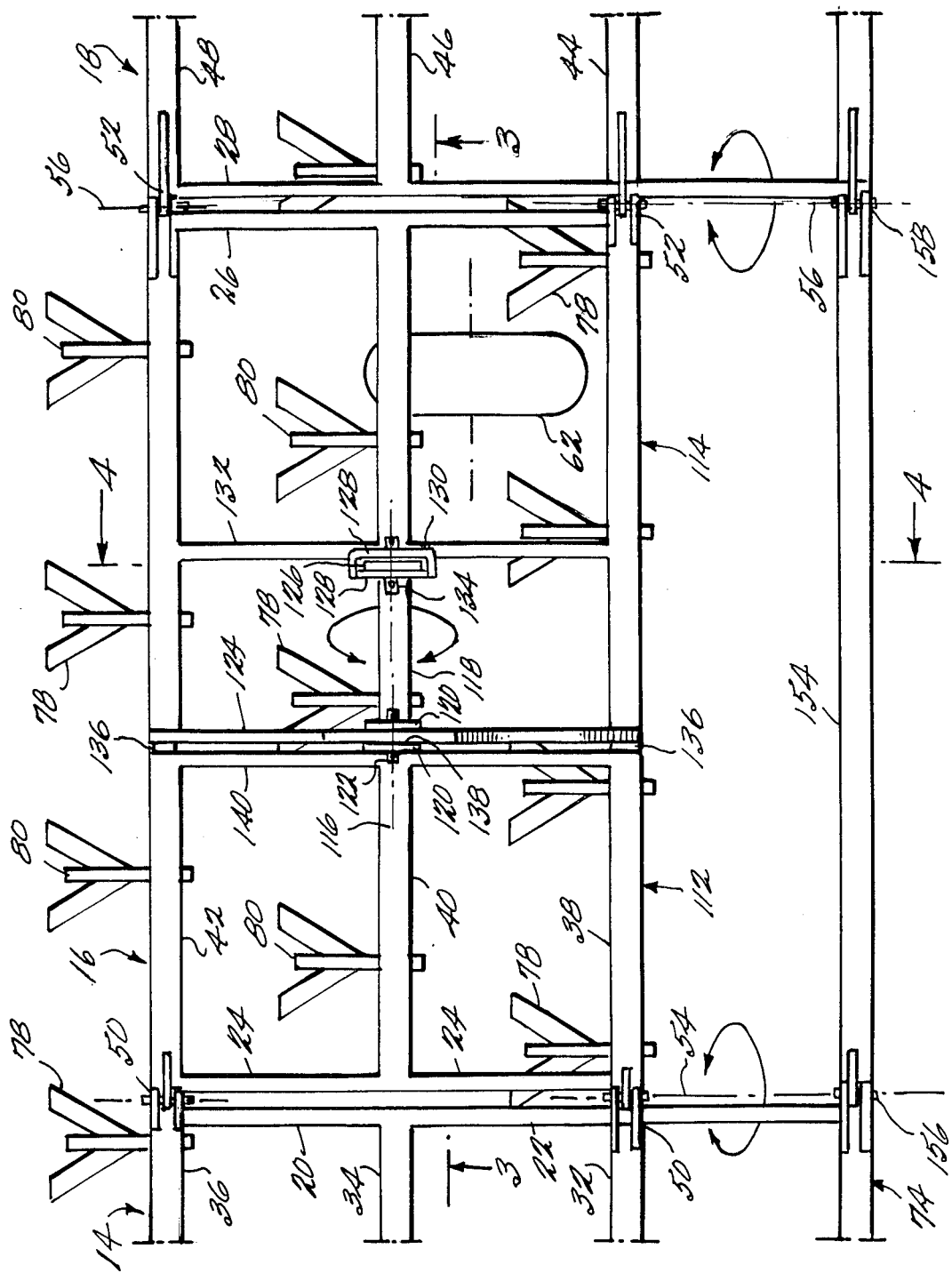

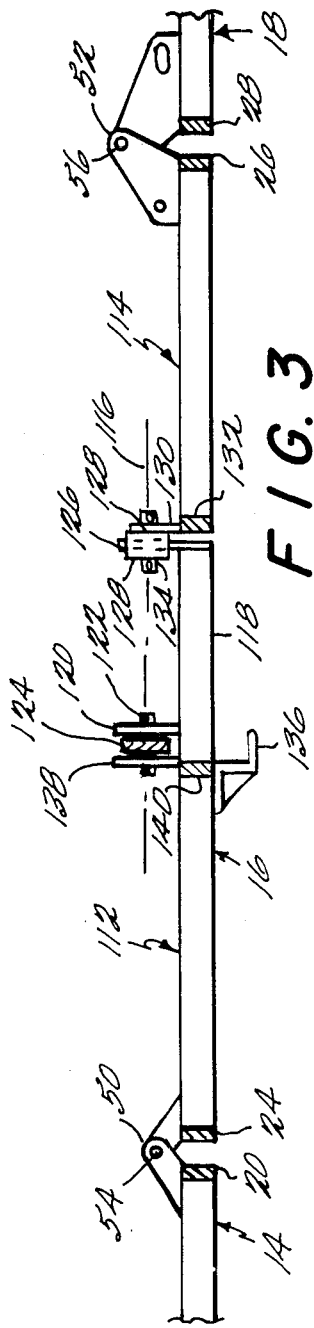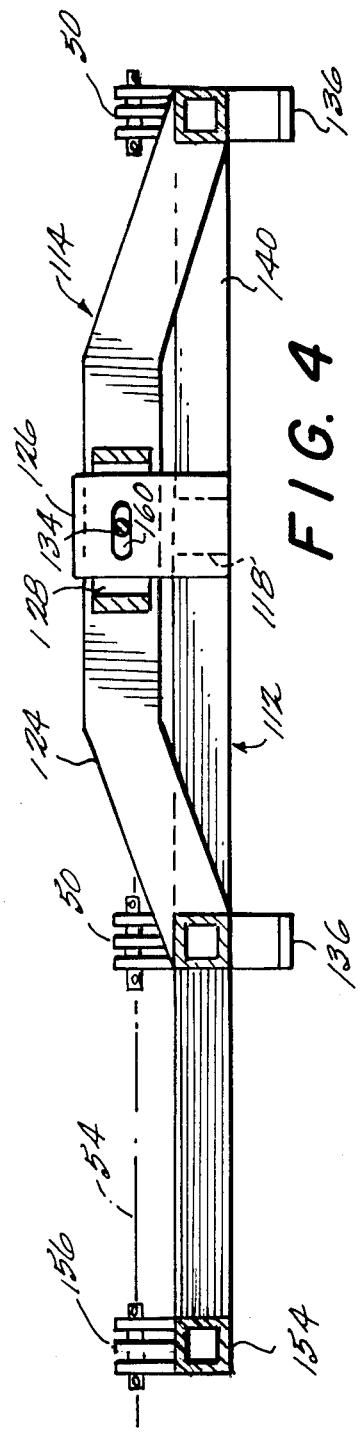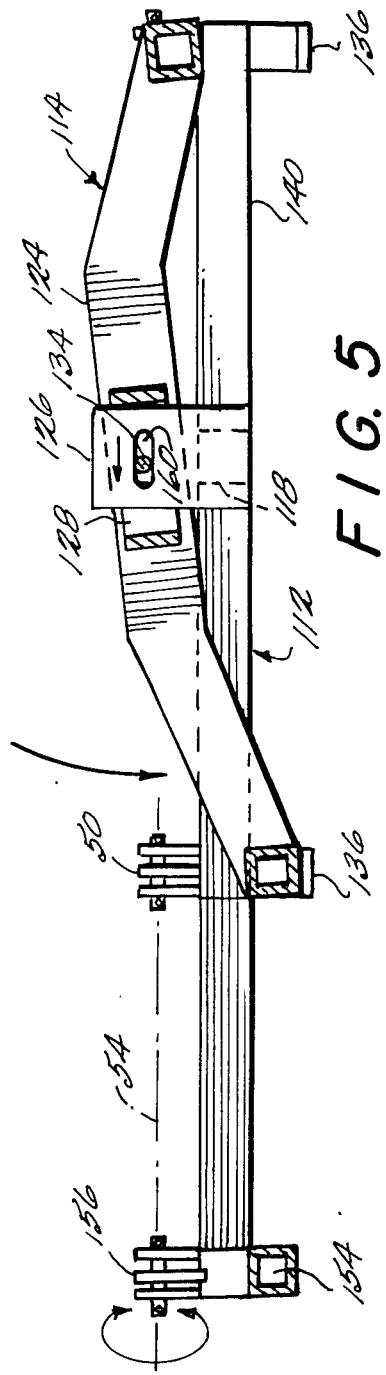

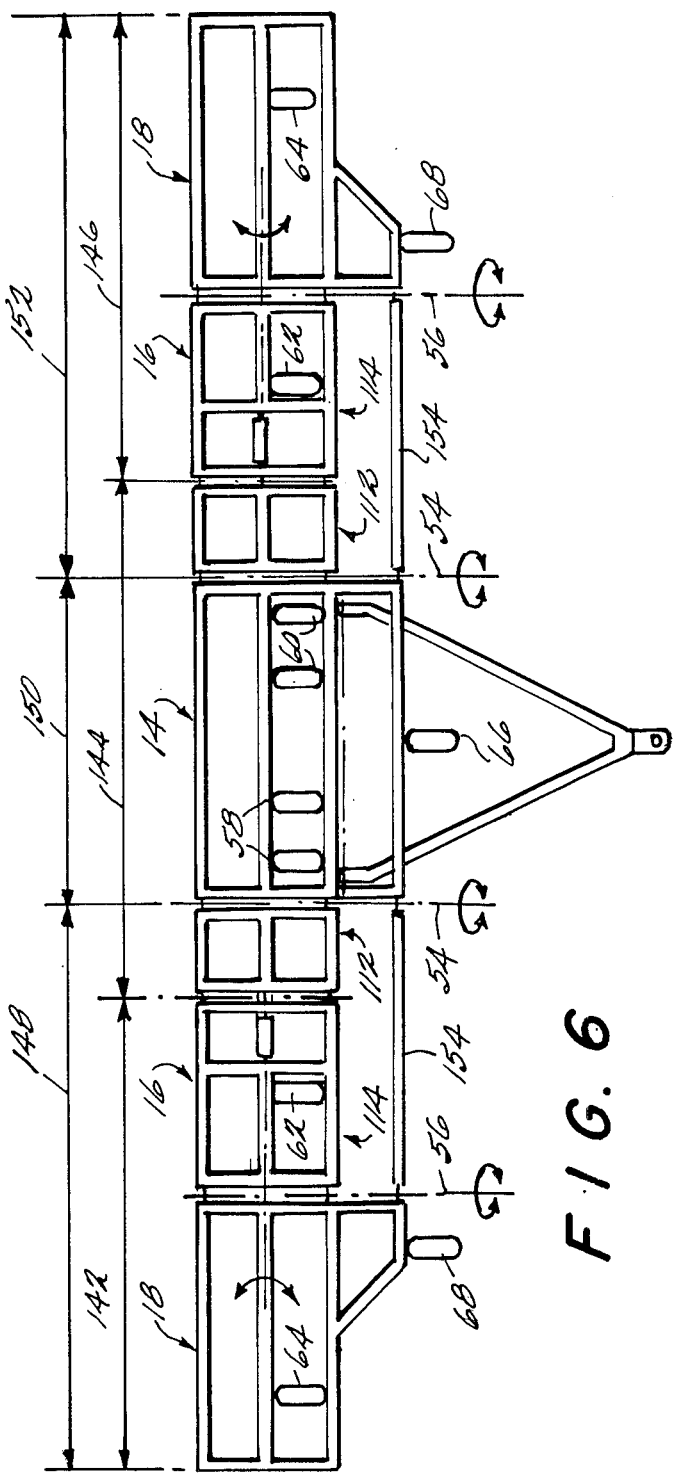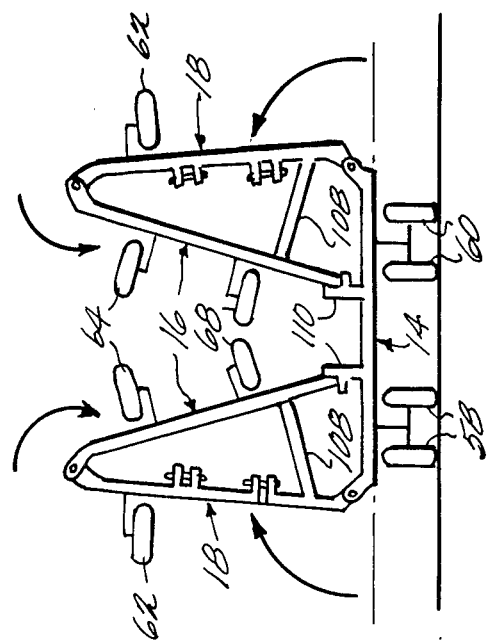

FLEXIBILITY FOR WIDE SWATH AGRICULTURAL IMPLEMENTS

FIELD OF THE INVENTION

This invention relates to improvements in flexibility for travelling machines, especially agricultural machines or implements, of large span or wide swath which enables the machine to follow the contours of undulating ground more closely and thus maintain a substantially constant above ground height while still allowing the machine to be folded easily into a compact form for non-operational transport. Such machines include, for example, tillage machines, seeders or drills, chemical and fertilizer applicators, harvesters or foragers, etc.

BACKGROUND OF THE INVENTION

Ever since farm machinery or implements were developed to cover wide swaths, attempts have been made to have the machines follow the contours of the ground, which in many areas undulates to various degrees. Very early, as shown, for example, in U.S. Pat. Nos. 2,641,886, 3,321,028 and 4,133,391 machines were proposed with hinged side-by-side frame sections to follow ground contours and also allow folding for transport. These machines, though they could only flex about their hinge axes generally parallel to the direction of travel, proved to be a big improvement over rigid frame machines. Hinged sectional-frame tillage implements also have been proposed to allow frames to flex about at least two angularly-divergent axes by having the several hinge axes arranged at various different angles relative to travel direction. This is shown, for example, in U.S. Pat. No. 3,487,882. This implement, however, cannot fold compactly. Further, even though that implement provides axes of flexibility at different angles, very often an individual flex axis will not match the contour of the ground.

Other highly flexible machines have been proposed which use a wide span hitch or drawbar to tow many small identical modular operational units, e.g., drills, as shown for example in U.S. Pat. No. 4,109,928. In that machine, each independent unit follows the ground contours of a narrow portion of the entire swath. This arrangement cannot be folded for transport, however, and requires an expensive hitch or drawbar which must be built with a strength comparable to that of the towed tillage units. In contrast to the machine of U.S. Pat. No. 4,109,928, cost efficient tillage equipment mounts tillage tools on a hitch type structure in which the frame serves a dual purpose.

Still other machines have been proposed that improve on hitches which tow identical operational units that independently follow ground contours. For example, U.S. Pat. No. 4,191,260 discloses a tow hitch with which it is possible to fold the individual operational units for transport. However, this structure is very complicated and, accordingly, expensive to build.

There are still other flexible improvements in wide-swath machines, such as those shown in U.S. Pat. Nos. 4,355,689 and 4,105,077, wherein the machines flex about their folding axes. While these machines have a high degree of flexibility and are less expensive to build than other machines of comparable flexibility, they allow flexing only about hinge axes and the folding mechanisms are very complex, particularly that in U.S. Pat. No. 4,355,698. Such complex folding mechanisms are not only expensive but also not entirely trouble free.

SUMMARY OF THE INVENTION

Accordingly, it is an object of this invention to provide a frame for wide swath travelling agricultural implements which not only has hinged wing sections that can be folded simply and easily for transport in compact form and also provide for frame flexibility about the hinge axes but also provides for flexibility within at least one of the wing sections about an axis at an angle to the hinge axes.

It is another object of this invention to provide such a frame of improved flexibility that is inexpensive to build, strong and of simple uncomplicated construction.

It is another object of this invention to provide such a frame with portions of nearly equal width which flex relative to adjacent portions about axes at an angle, preferably 90°, to the hinge axes.

The foregoing objects are accomplished by making at least one of the hinged frame sections in two separate side-by-side parts, or laterally adjacent subframes, and pivotally connecting the parts for relative movement about an axis at an angle to the hinge axes. Preferably the axis is transverse, i.e. 90°, to the hinge axes.

Other objects and advantages will be obvious from the following detailed description and accompanying drawings.

BRIEF DESCRIPTION OF THE DRAWINGS

FIG. 2 is a somewhat schematic plan view of the inboard wing section of the frame of the cultivator shown in FIG. 1, certain parts being omitted for clarity.

FIG. 3 is a sectional view taken along line 3—3 of FIG. 2.

FIG. 4 is a sectional view taken along line 4—4 of FIG. 2.

FIG. 5 is a sectional view corresponding to FIG. 4 but showing relative flexing between parts thereof.

FIG. 6 is a schematic plan view of the entire cultivator shown in FIG. 1.

FIG. 7 is a schematic elevational view of the entire cultivator shown in FIG. 1 in folded condition.

DETAILED DESCRIPTION OF THE INVENTION

Figure 1:
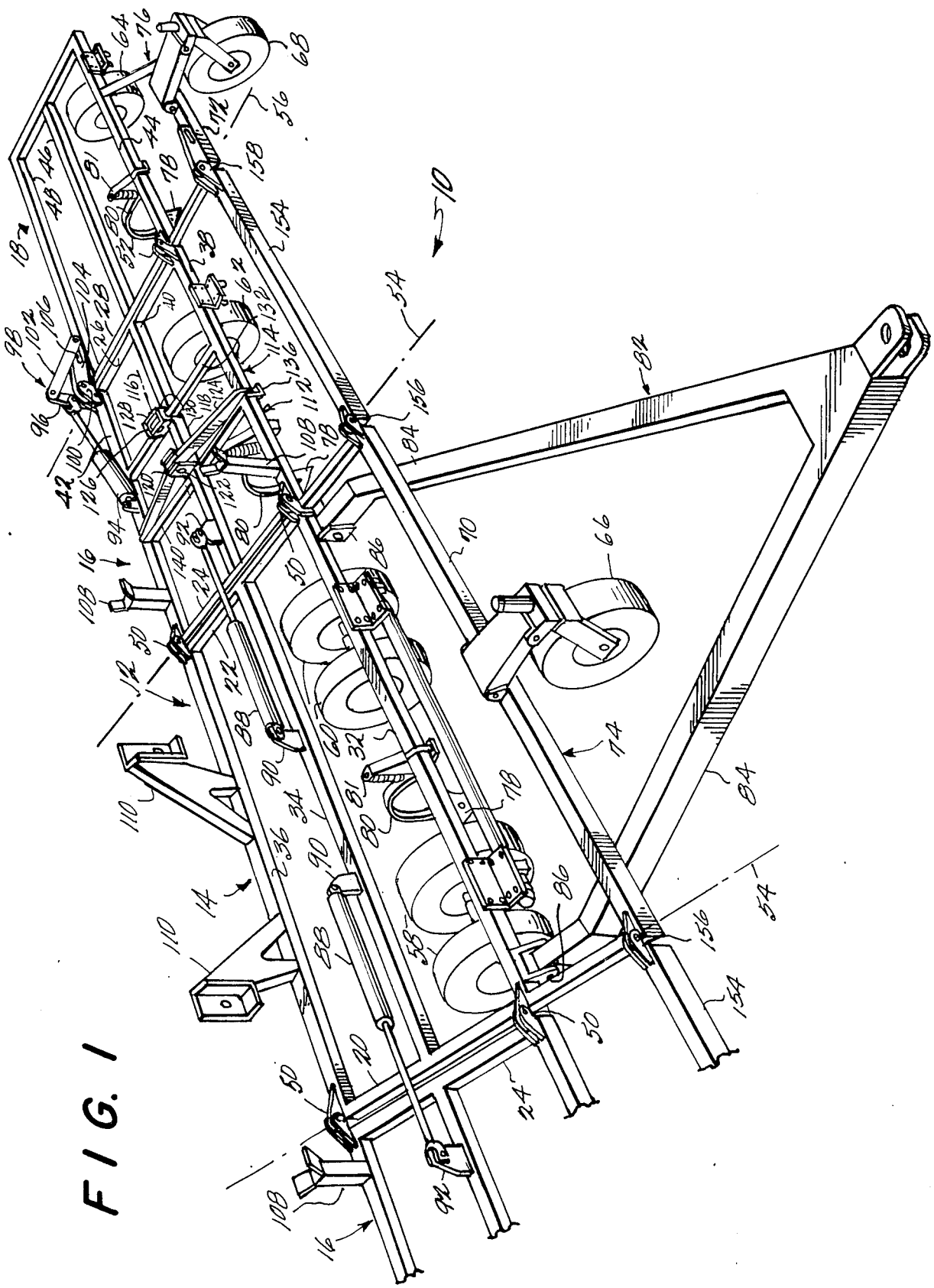
FIG. 1 is a perspective view of a portion of a wide swath cultivator embodying this invention, certain parts being omitted for simplicity and clarity.

Referring now to FIG. 1 of the drawings, there is shown a portion of a typical wide swath cultivator 10 embodying this invention. The cultivator 10 has a frame 12 made up of plurality of frame sections arranged side-by-side and hinged together for folding the cultivator into a compact unit for transport and also for permitting relative flexing between adjacent frame sections about axes parallel to travel direction to enable each section to conform more closely to the contours of undulating or uneven ground in order to maintain a substantially constant above ground height. Typically the cultivator 10 may have a central main frame section 14, an inboard wing frame section 16 on each side of the main section and an outboard wing frame section 18 on the outboard side of each inboard wing frame section. The wing sections 16 and 18 on only one side of the main section 14 are shown in FIG. 1. The various frame sections 14, 16 and 18 conventionally are generally rectangular in plan view and formed of side or longitudinal bars 20, 22, 24, 26, 28, 30, respectively, and transverse bars 32, 34, 36, 38, 40, 42, 44, 46, 48, respectively, of any conventional cross-section, such as the box section shown. The side bars of adjacent sections are connected by pairs of longitudinally spaced hinges 50, 52 to enable the wing sections 16, 18 to be folded compactly for transport as shown in FIG. 7. The hinges 50, 52 also enable the adjacent sections to flex relative to each other about the hinge axes 54, 56, which are substantially parallel to travel direction.

Two transversely spaced sets 58, 60 of dual wheels are fastened to the forward or leading transverse bars 32 of the main frame section 14 while single wheels 62, 64 are fastened to the forward or leading transverse bars 38, 44 of the inboard and outboard wing sections 16, 18, respectively. Castor wheels 66, 68 are fastened to the transverse bars 70, 72 of integral forward extensions 74, 76 of the main and outboard wing sections 14, 18, respectively. Thus, the wheels 58, 60 and 66 support the main section 14; the wheels 62 support the inboard wing sections 16, while the wheels 64 and 68 support the outboard wing sections 18. All the wheels desirably are provided with conventional mounting means (not shown) for adjusting the wheels vertically with respect to the entire frame 12 to adjust the above ground height of the cultivator 10. Cultivator sweeps 78 with shanks 80 fastened to spring trips 81 are clamped to the transverse bars of the several sections, as shown in FIGS. 1 and 2. The cultivator 10 is adapted to be pulled by a hitch 82 having spaced arms 84 attached, as at 86, to the leading transverse bar 32 of the main section 14 for pivotal movement about a transverse axis. It will be understood, however, that the invention is equally applicable to push or self-propelled types of wide swath implements.

Conventional wing lifts of many types can be used for folding the wing sections 14, 16 for transport. For example, linear actuators, e.g. hydraulic cylinders 88, may be pivotally connected to brackets 90, 92 on top of the main and inboard wing sections 14, 16, respectively, to pull the latter to a nearly upright position as shown in FIG. 7. The connection of the actuators 88 to the brackets 90, 92 provides for a degree of lost motion, e.g. by elongated or enlarged pivot pin holes (not shown), when the actuators are fully extended and the wing sections are in operational position to permit limited relative flexing between the main and the inboard wing sections 14, 16 about the axis 54 of the hinges 50. As a further example, linear actuators, e.g. hydraulic cylinders 94, may be pivotally connected to the inboard wing sections 26 and to one arm 96 of toggle linkages 98 having the arms 96 pivotally connected to brackets 100 on the corresponding inboard sections 16 and the other arms 102 to brackets 104 on the corresponding outboard sections, to fold the outboard sections over the inboard sections 18, as shown in FIG. 7. Again, lost motion is provided in the connections of the actuators 94, as by elongated pivot pin holes 106 in the brackets 104, to permit limited relative flexing between the inboard and outboard wing sections 16, 18, when in operational position, about the axis 56 of the hinges 52.

Cradle type supports 108 are provided on the leading and trailing transverse bars 38, 42 of the inboard wing sections 16 to support the corresponding transverse bars 44, 48 of the outboard wing sections 18 when folded over the inboard sections, as shown in FIG. 7. Further, when the inboard and outboard wing sections 16 and 18 are folded to the transport positions shown in FIG. 7, the outboard side bars 30 of the outboard wing sections 18 rest on supports 110 on the transverse bar 36 of the main section 14.

As previously noted, most soil that is worked is not perfectly level. In fact, a great deal of arable land has irregular contours. If the flows of the irregularities are generally parallel, and if a wide swath implement having hinged frame sections, such as the cultivator 10, travels parallel to such flows, the hinges will allow the several frame sections to conform generally to the contours of the ground. In fact, however, there are very few situations where fields can be worked by following generally parallel flow contours. Most contoured soil or ground is randomly irregular. Working such soil causes wide-swath agricultural implements, such as the cultivator 10, to have a tendency to bend or twist about many axes that are not parallel to travel direction. This invention allows wide-swath agricultural machines not only to fold compactly and to twist or flex about axes which are substantially parallel to travel direction but also to twist or flex about axes substantially transverse or at right angles to travel direction in order to follow soil contours more closely and thus allow the machine to remain at a substantially constant above ground height. Such a substantially constant above ground height obviously is desirable for soil treating or working operations.

Referring again to the drawings, this invention is applied to the typical cultivator 10 by dividing the inboard wing sections 16 into two separate subsections, one inboard 112 and one outboard 114. These subsections 112, 114 are connected by pivotal means which allows the subsections to pivot relative to each other about an axis 116 substantially transverse to travel direction. While this pivotal connection can be accomplished by substantially any practical conventional means, it is desirable that it be as strong and rugged as possible without undue weight or complexity. For this purpose, the inboard subsection 112 is provided with a short outboard extension 118 of the middle transverse bar 40 which overlaps the outboard subsection 114. Upstanding from the inboard end of the extension 118 are parallel flanges 120 through which extends a transverse pivot pin 122 that also extends through an upwardly arched inboard side bar 124 of the outboard subsection 114. On the outer or outboard end of the bar extension 118 there also is provided an upright flange 126 flanked on each side by flat side portions 128 of an enclosing bracket 130 attached to a longitudinal bar 132 of the outboard subsection 114. Through these side portions 128 and through the flange 126 extends a pivot pin 134. Thus it will be seen that the inboard and outboard subsections 112, 114 can pivot relative to each other about a transverse axis 116 aligned with the pivot pins 122, 134. Preferably, such relative pivotal movement is limited by stops 136 on the outboard corners of the inboard subsection 112 engageable by corresponding inboard corners of the outboard subsection 114. Also it is desirable to fasten wear plates 138 to one or the other of the subsections 112, 114 between the ends of their adjacent side bars 124, and inboard flange 120 to receive the compression loads between the subsections.

While the aforedescribed feature which enables portions of the frame 12 to flex relative to each other about a transverse axis 116 can be located at any lateral position in the frame, desirably the pivotal connections are located so as to divide the implement into side-by-side portions of nearly equal width which can flex relative to each other about the transverse axis 116. In the described embodiment of the invention there are three such portions 142, 144, and 146 that are indicated by dimensional arrows in FIG. 6. It will be seen that the central portion 144 includes the main frame section 14 and the inboard subsections 112 of the inboard wing sections 16. The other two portions 142 and 146 each include an outboard subsection 114 of an inboard wing section 16 and the corresponding outboard wing section 18. While it would be possible to locate the pivotal connections of the wing subsections closely adjacent the several hinge axes 54, 56, such locations would be undesirable because it would result in frame portions of disproportionate widths, as shown by the dimensional arrows 148, 150, 152 in FIG. 6, which could flex relative to each other about a transverse axis. While with such location, the side or outboard frame portions 148 and 152 would be of substantially equal width, they would be quite large and almost twice the width of the central portion 150.

The aforedescribed pivotal connections allow the outer side portions 142 and 146 of the cultivator 10 to flex or twist about the transverse axis 116 independent of the orientation of the central portion 144. Because the outboard portions 142, 146 are supported directly by the wheels 62, 64 and 68, these portions 142, 146 can follow the contours of the ground on which those wheels ride. Similarly, the central portion 144 will follow the contours of the ground on which the wheels 58, 60 and 66 ride. Thus, if the ground on which the wheels 58, 60 and 66 ride is flat while that on which the wheels 62, 64, 68 ride is uphill or downhill relative to travel direction, the outboard portions 142, 146 can flex about the transverse axis 116 to accommodate those portions to the uphill or downhill contours of the ground. At the same time, if the ground contours on which the outboard portions 142, 146 ride are side hill relative to travel direction, the wing sections 16, 18 can flex about the hinge axes 54, 56 to closely follow those ground contours.

The aforedescribed relative pivotal movement about the transverse axis 116 is limited by stops 136 to prevent excessive relative flexing of the several portions 142 and 146 about the transverse axis which might cause one or both of the side portions 142 and 146 to overturn and damage the implement 10. The relative pivotal movement also is limited to facilitate the folding of the outboard wing sections 18 over the inboard wing sections 16. In this connection, it will be seen that the wing section supports 108 are of cradle design so that they will accept the transverse bars 44, 48 of the outboard wing sections 18 even if the latter are angularly displaced about the transverse axis 116 relative to the central portion 142 of the frame 12. Further folding of the outboard wing sections 18 into the cradle supports 108 will cause the outboard portions 142, 146 to become realigned with the central portion 144 as respects the transverse axis 116.

While the aforedescribed pivotal connections between the inboard and outboard subsections 112, 114 are relatively strong, it will be seen that during operation of the implement 10 a tremendous force is applied to the outboard portions 142, 146 to urge them to fold rearwardly about upright axes extending through the pivotal connections effected by the flanges 120 and pin 122. Although these pivotal connections could be built strong enough to resist such bending moments, the materials would become undesirably heavy and bulky and, consequently, expensive. Therefore, a simple solution to this problem is provided by the provision of long links 154 which connect adjacent portions 142, 144, 146 to resist such bending moments while permitting folding of the wing section 16, 18 as aforedescribed. For this purpose links 154 are connected by a hinge 156 to each forward corner of the extension 74 on the main section 14 and also by a hinge 158 to the inboard forward corner of the corresponding outboard wing section 18. These hinges 156, 158 provide for pivotal movement of the corresponding link 154 about the hinge axes 54, 56. Thus, the links 154 do not interfere with folding movements of the inboard and outboard wing sections 16, 18 about their hinges 50, 52. At the same time, it will be seen that the links 154 resist the rearward bending moments exerted by the outboard portions 142, 146 on the pivotal connections about the aforementioned upright axes. For their greater effectiveness, the links 154 are relatively long and located forward of the inboard wing sections 16.

It will be seen, however, that when an outboard subsection 114 pivots relative to the corresponding inboard subsection 112, caused by the portions 142, 146 independently following ground contours, there will be a force caused by tension loading of the link 154 as it pivots up or down about the axis 54 to cause the outboard portion 142 or 146 to bend slightly forward about the upright axis extending through the pivotal connection effected by the flanges 120 and the pin 122. To allow for such slight bending of the outboard portion, there is, as shown in FIGS. 4 and 5, provided horizontal lost motion, as by elongation of the pivot pin hole 160 in the flange 126, in the pivotal connection afforded by the side portions 128, the flange 126 and the pivot pin 134. Similarly, angular movement of the link 154 relative to the central and outboard portions 142, 144, 146 causes the link 154 to twist about its longitudinal axis, as shown in FIG. 5. To allow for this effect, the hinge connections of the link 154 are relatively loose, e.g. provided with oversize holes for the pins of the hinges 156, 158 or the connections are of a universal type to avoid undue stress on the parts. In operation, it will be seen that the link 154 is primarily in tension, while the interconnection of the subsections 112, 114 will be loaded in compression, as well as shear.

The axes of the wheels 62 for the inboard wing sections 16 should be located at, near, or below the transverse pivotal axis 116. This facilitates flexing of the various sections and portions about the various flexing axes and will allow the tools of the implement, e.g. the cultivator sweeps 78, to better follow the contours of the ground to remain at a substantially constant depth therein.

It will be seen that the flexible features of this invention can be incorporated in various types of agricultural implements, such as tillage, harvesters, chemical applicators, seed drills, and the like. Further, a wide variety of wing lifts can be used as well as various types of hinges and universal joints. Further, the flexibility features can be incorporated in any number of sections of a multisection wide swath implement. The pivotal interconnection of the subsections may be had by a wide variety of bearings or pinned devices. Further, the links may be provided as separate sections on which cultivating tools can be mounted. The hitch also may be of various types.

It also will be seen that the features of this invention which involve flexing about a transverse axis can be made very strong while utilizing inexpensive wing folding mechanisms. It also provides for better proportional spacing of the pivotal interconnections. The feature which involves flexing about a transverse axis does not require the use of expensive ball or other universal type joints but can be provided by simple pivot pin interconnections. Further, no extra wheels or special complex parts, like special wing lifts, are required.

It thus will be seen that the objects and advantages of this invention have been fully and effectively achieved. It will be realized, however, that the foregoing specific embodiment has been disclosed only for the purpose of illustrating the principles of this invention and is susceptible of modification without departing from such principles. Accordingly, the invention includes all embodiments encompassed within the spirit and scope of the following claims.

What is claimed is:

1. A flexible frame for wide-swath traveling agricultural implements adapted to follow the contours of the ground and maintain a substantially constant height relative thereto, comprising:
    a plurality of frame sections arranged side-by-side relative to travel direction and each adapted to be supported by at least one ground-engaging wheel;
    hinge means connecting adjacent of said sections for relative flexing therebetween about an axis substantially parallel to travel direction for following ground contours and for folding of at least one of said adjacent sections relative to the other for non-operational transport of the implement;
    at least one of said sections comprising a pair of separate subsections arranged side-by-side relative to travel direction; and
    pivot means connecting said subsections to each other for relative flexing between side-by-side portions of said frame about an axis substantially perpendicular to travel direction and located about midway between fore-and-aft ends of said sections with respect to said travel direction, each of said portions being adapted to be supported by at least two wheels spaced apart in the direction of travel, whereby said portions more readily follow ground contours.

2. The frame defined in claim 1 including stop means on at least one of the subsections for limiting the relative flexing between the portions.

3. The frame defined in claim 1 in which the frame is adapted to travel by exertion of a forward directed force on a section other than the said at least one section, and including:
    link means connected to and between the frame portions for reinforcing the pivot means to resist a travel-induced bending moment thereon about a substantially upright axis while allowing the relative flexing and folding about the hinge means axis.

4. The frame defined in claim 3 in which the pivot means includes:
    a first pivotal connection adjacent the confronting sides of the subsections;
    an extension on one of said subsections laterally overlapping the other subsection; and
    a second pivotal connection between said extension and said other subsection, said second connection including horizontal lost motion means to allow a degree of bending, of said other subsection about the upright axis, induced by movement of the link means relative to said subsections.

5. The frame defined in claim 3 or 4 in which the connections of the link means to the portions are relatively loose to permit angular movement of said link means about its longitudinal axis.

6. The frame defined in claim 1 or 3 including cradle means on said frame for aligning and supporting the subsections against relative pivotal movement when the foldable section is folded.

7. A flexible frame for wide-swath traveling agricultural implements adapted to follow the contours of the ground and maintain a substantially constant height thereabove, comprising:
    a central section adapted to be supported by at least one ground-engaging wheel and having on each side thereof at least one wing section adapted to be supported by at least one ground-engaging wheel;
    hinge means connecting each of said wing sections to said central section for relative flexing therebetween about an axis substantially parallel to travel direction for following ground contours and for folding of said wing sections relative to said central section for transport;
    each of said wing sections comprising:
    separate subsections arranged side-by-side relative to travel direction; and
    pivot means connecting said subsections to each other for relative flexing between adjacent side-by-side portions of said frame about an axis substantially perpendicular to travel direction and located about midway between fore-and-aft ends of said sections with respect to said travel direction, each of said portions being adapted to be supported by at least two wheels spaced apart in the direction of travel, whereby said portions more readily follow ground contours.

8. The frame defined in claim 7 including stop means on one of the subsections of each of the wing sections for limiting the relative flexing between the corresponding portions.

9. The frame defined in claim 7 including link means connected to and between the portions for reinforcing the pivot means to resist a travel-induced bending moment thereon about a substantially upright axis while allowing the relative flexing and folding about the hinge means axis.

10. The frame defined in claim 9 in which the pivot means includes:
    a first pivotal connection adjacent the confronting sides of the subsections;
    an extension on one of said subsections laterally overlapping the other subsection; and
    a second pivotal connection between said extension and said other subsection, said second connection including horizontal lost motion means to allow a degree of bending, movement of said other subsection about the upright axis, induced by movement of the link means relative to said subsections.

11. The frame defined in claim 9 or 10 in which the connections of the link means to the portions are relatively loose to permit angular movement of said link means about its longitudinal axis.

12. The frame defined in claim 7 wherein the widths of the frame portions which extend (a) between the outboard sides of the inboard subsections, and (b) between each of said sides and the corresponding outboard side of the frame, are generally the same.

13. The frame defined in claim 7 including cradle means on said frame for aligning and supporting the subsections against relative pivotal movement when the wing sections are folded for transport.

14. The frame defined in claim 7 or 12 including at least one additional wing section hinged to each of the wing sections that are hinged to the central section for relative flexing between adjacent wing sections about an axis substantially parallel to travel direction for following ground contours and for folding of said wing sections for transport.

* * * * *